US006605138B2

(12) United States Patent
Frondorf

(10) Patent No.: US 6,605,138 B2
(45) Date of Patent: Aug. 12, 2003

(54) APPARATUS AND METHOD FOR EXCLUSIVELY REMOVING VOC FROM REGENERATABLE SOLVENT IN A GAS SWEETENING SYSTEM

(75) Inventor: Matthew T. Frondorf, P.O. Box 461084, San Antonio, TX (US) 78246-1084

(73) Assignee: Matthew T. Frondorf, San Antonio, TX (US)

(*) Notice: Subject to any disclaimer, the term of this patent is extended or adjusted under 35 U.S.C. 154(b) by 441 days.

(21) Appl. No.: 09/296,118

(22) Filed: Apr. 21, 1999

(65) Prior Publication Data

US 2002/0012622 A1 Jan. 31, 2002

(51) Int. Cl.$^7$ .............................................. B01D 53/14
(52) U.S. Cl. ............................ 95/160; 95/172; 95/192; 95/236; 95/237; 96/234; 423/228; 423/229
(58) Field of Search ................................ 423/228, 229, 423/245.2; 95/161, 173, 174, 237, 238, 239, 240, 160, 172, 192, 236; 96/234

(56) References Cited

U.S. PATENT DOCUMENTS

| | | | |
|---|---|---|---|
| 2,237,386 A | | 4/1941 | Carney |
| 2,504,429 A | * | 4/1950 | Latchum, Jr. |
| 2,630,402 A | | 3/1953 | Miller et al. |
| 2,806,552 A | | 10/1957 | Koble |
| 2,907,409 A | | 10/1959 | Koble |
| 3,435,590 A | | 4/1969 | Smith |
| 3,495,933 A | * | 2/1970 | Renault et al. |
| 3,590,555 A | | 7/1971 | Wackernagel |

(List continued on next page.)

FOREIGN PATENT DOCUMENTS

| | | | |
|---|---|---|---|
| DE | 3236600 | * | 4/1984 |
| DE | 3427134 | * | 2/1986 |

OTHER PUBLICATIONS

Jay Collie and Michael Hlavinka—Bryan Research and Engineering, Inc.; andAMY ASHWORTH—Amoco Exploration and Production, "An Analysis of BTEX emissions from Amine Sweetening and Glycol Dehydration Facilities," *1998 Laurance Reid Gas Conditioning Conference Proceedings*, Norman, Oklahoma: University of Oklahoma. pp. 1–10.

David C. Morrow—South Tex Treaters, Inc. and Kevin M. Lunsford—Bryan Research and Engineering, Inc., "Removal and Disposal of BTEX Components form Amine Plant Acid Gas Streams," *Proceedings of the Seventy–Sixth GPA Annual Convention*, Tulsa, OK: Gas Processors Association, 1997: pp. 1–4.

*Primary Examiner*—Duane S. Smith
(74) *Attorney, Agent, or Firm*—Royston Rayzor Vickery & Williams LLP; William P. Glenn, Jr.

(57) ABSTRACT

A method for removing residual VOC components from a fluid stream used in the sweetening of sour gas at gas processing plants. In a retrofit configuration, the method includes interposing a supplemental VOC removal station after a primary VOC removal station in an absorbent fluid stream. The absorbent fluid stream incorporates fluid into which sour gas components and VOC have been absorbed from a treated gas stream such as produced natural gas. The primary VOC removal station is configured to remove an initial portion of the absorbed VOC from the absorbent fluid stream. The supplemental VOC removal station is configured to liberate a portion of residual absorbed VOC remaining in the absorbent fluid stream downstream from the primary VOC removal station. Further, the supplemental VOC removal station is configured to avoid liberating absorbed sour gas components from the absorbent fluid stream. Alternatively, a single, but enhanced performance VOC removal station is utilized to liberate a sufficient proportion of the absorbed VOC from the absorbent fluid stream.

34 Claims, 2 Drawing Sheets

U.S. PATENT DOCUMENTS

| | | | |
|---|---|---|---|
| 3,594,985 A | * | 7/1971 | Ameen et al. |
| 3,767,766 A | * | 10/1973 | Tjoa et al. |
| 4,097,250 A | | 6/1978 | Pagani et al. |
| 4,184,855 A | | 1/1980 | Butwell et al. |
| 4,414,004 A | * | 11/1983 | Wagner et al. |
| 4,421,535 A | | 12/1983 | Mehra |
| 4,478,799 A | | 10/1984 | Bengeser et al. |
| 4,511,381 A | * | 4/1985 | Mehra |
| 4,548,620 A | | 10/1985 | Albiol |
| 4,578,094 A | | 3/1986 | Mehra |
| 4,797,140 A | | 1/1989 | Landeck et al. |
| 4,810,267 A | * | 3/1989 | Landeck et al. |
| 4,853,012 A | | 8/1989 | Batteux et al. |
| 5,137,550 A | | 8/1992 | Hegarty et al. |
| 5,209,762 A | * | 5/1993 | Lowell |
| 5,453,114 A | * | 9/1995 | Ebeling |
| 5,490,873 A | * | 2/1996 | Behrens et al. |
| 5,536,303 A | * | 7/1996 | Ebeling |
| 5,766,313 A | * | 6/1998 | Heath |
| 5,797,981 A | | 8/1998 | Collin et al. |
| 5,820,837 A | | 10/1998 | Marjanovich et al. |
| 6,004,380 A | * | 12/1999 | Landreau et al. |
| 6,183,540 B1 | * | 2/2001 | Thonsgaard |
| 6,342,091 B1 | * | 1/2002 | Menzel et al. |
| 2002/0007733 A1 | * | 1/2002 | Morrow |

* cited by examiner

APPARATUS AND METHOD FOR EXCLUSIVELY REMOVING VOC FROM REGENERATABLE SOLVENT IN A GAS SWEETENING SYSTEM

DESCRIPTION

1. Technical Field

The present invention relates generally to a process for treating natural gas and other fluid streams, and exemplarily for a liberating process of VOC and BTEX components from a regeneratable solvent fluid stream wherein the solvent fluid stream also contains acid gas components that are to be retained in solution for subsequent and separate removal.

2. Background Art

Most natural gas when initially produced from a well is not "clean", but is instead laden with associated compounds that may require removal prior to utilization of the natural gas as a fuel gas. Naturally occurring compounds in the natural gas include VOC (volatile organic compounds) and acid gas, all of which may be required to be removed in a gas treatment process. Generally speaking, and especially within the present disclosure, acid gas refers to the constituent components, carbon dioxide and/or hydrogen sulfide, that are often entrained in a produced natural gas flow stream. If a gas flow stream is high in hydrogen sulfide content, it may be classified as "sour", regardless of its carbon dioxide content. If a gas stream is high in carbon dioxide, but not necessarily hydrogen sulfide, it is generally referred to as "high $CO_2$ gas." In common usage, however, and as used herein, "sour" gas is utilized to describe a gas that is "off spec"; that is, high in content with respect to either carbon dioxide or hydrogen sulfide. A gas stream is said to be "sweetened" by a process that removes the acid gas therefrom.

The primary component of natural gas is methane which typically accounts for about ninety percent of the produced gas. Organic compounds entrained in the gas and that are heavier than ethane are typically considered by regulatory agencies to be VOC. There is also a subset of the VOC's which are referred to as BTEX and includes benzene, toluene, ethylbenzene and xylene. In terms of environmental impact and regulatory restraints, VOC's will normally have certain limits placed upon their free release as will BTEX's, but the limits will be more stringent with respect to the subset, BTEX, of the VOC's. An example would be the allowance of twenty-five tons per year of total VOC, but only ten tons per year of BTEX in a vent stream.

U.S. Pat. No. 4,548,620 exemplifies a conventional and still utilized process for treating natural gas. Therein, an amine based solvent is used as a stripping agent for acid gas. Because of the type of solvent used for the stripping, VOC is also stripped therefrom and entrained in the solvent. In this system and others of conventional design, the VOC and acid gas components have an affinity for the amine solution and are absorbed by physical and/or chemical reaction thereinto. The solvent is referred to as being "lean" when not laden with contaminants and as "rich" when entrained with contamination.

In a conventional system, after an adequate contacting process has been undergone to expose the sour gas to the amine solvent, the highly pressurized rich absorbent fluid stream of amine is processed to a flash tank where the pressure is reduced from approximately 900 psia to approximately 65 psia. In the example of the '620 patent, this flash process is conducted at approximately 85 psia. When this occurs, the more volatile absorbed components "fiz" back out of the amine solution and are liberated therefrom. These released gases can be used as fuel gas or flared off. This portion of the regeneration process for the amine stream removes a portion of the VOC.

As may be best appreciated in the figures of the '620 patent, the elevational relative position of the flash tank 18 is significantly lower than the feed point of the stripper 22. As a result, the process within the flash tank must be conducted at such a pressure as the indicated 85 psia in order to provide sufficient pressure to conduct the processed liquid amine solution through piping, valves, heat exchangers, filters and to the higher feed point near the top of the stripper. This construction is what is typical, and that which is regularly encountered in present designs and installations. It should also be appreciated that the flash process occurs at approximately 155 degrees Fahrenheit in the flash tank of the '620 patent. This is also typical of known processing plants.

Because of the pressure constraints that require the flash process to be conducted at pressures on the order of 85 psia as exemplified in the '620 patent, only a limited amount of VOC can be liberated from the solvent. This temperature and pressure, however, is not appropriate for liberating the acid gas from the solvent stream. In many cases, a substantial amount of the VOC that is entrained in the amine solvent is not removed in these typical flash tank conditions and therefor remains in solution, still absorbed in the solvent that is conducted downstream for further processing. In such conventional designs, the VOC-rich amine solution leaves the flash tank and most of the acid gas components are subsequently removed in a stripper, together with a large portion of the remaining VOC. This amount of VOC often exceeds regulations dealing with environmental pollution and is therefore desired to be eliminated.

There are cases in which the exhaust gas stream from the stripper is high in carbon dioxide, but contains acceptably low amounts of hydrogen sulfide to enable venting or flaring. There still may be, however, amounts of VOC present that are too high for venting and therefore regulations require the effluent stream from the stripper to be burned in a flare to rid it of the environmentally offending VOC content. The problem encountered at this juncture of the process is that this gas stream is not sufficiently flammable to burn under its own combustibility because of the high $CO_2$ content. Therefore, fuel gas must be introduced for the effluent stream in sufficient quantities to permit its being burned in a flare. In practice, the amount of fuel gas required is significant and can add an appreciable cost to the processing of the gas. It is not unusual for this cost to amount to as much as $100,000 per year.

In practice, it is not uncommon for a gas processing plant to be compliant with respect to VOC (as an example less than twenty-five tons per year) but out of compliance with respect to BTEX (as an example, more than ten tons per year) in the stripper's exhaust gas content. Therefore, it stands to reason that the owners of such gas processing plants are very interested in improving their compliance with respect to VOC and BTEX emissions, and minimizing or eliminating the need for adding as much as $100,000 per year in fuel gas to the process to flare the VOC and high $CO_2$ content stripper exhaust stream. These plants, however, continue to incur such expense without having invented a suitable solution for both the design of new plants and for retro-fitting existing gas processing plants that will reduce or eliminate this high cost of regulatorily compliant operation.

In view of the above described deficiencies associated with the use of known designs for process treatments of natural gas, the present invention has been invented and developed to alleviate these drawbacks and provide further benefits to the user. These enhancements and benefits are described in greater detail hereinbelow with respect to several alternative embodiments of the present invention.

DISCLOSURE OF THE INVENTION

The present invention in its several disclosed embodiments alleviates the drawbacks described above with respect to conventionally designed gas treatment processes and incorporates several additionally beneficial features. In the illustrated embodiment, the present invention interposes a supplementing or performance enhanced VOC removal station in the treatment process. In the supplementing format, the existing VOC removal station (typically in the form of a flash tank) may be supplemented with: (1) a supplementing high temperature flash tank (gas separator) between the original VOC flash tank and the stripper tower; (2) a supplementing low pressure flash tank at that same location; or (3) a supplementing low pressure/high temperature flash tank at that same location, each such supplementing flash tank being includeable for the purpose of removing a predominance of the remaining VOC after the original flash tank and before the stripper. What is important is that the temperature and/or pressure are regulated at this supplementary flash tank so that conditions are appropriately maintained for liberating the VOC from the amine solution flow, but not the acid gas constituents. In this manner, a VOC rich gas exhaust stream is produced from the supplementing flash tank, much like that produced in the original flash tank, that is sufficiently flammable based on its own content to be flared because it is not significantly diluted with incombustible carbon dioxide. In some situations, a small amount of fuel gas may be required to burn the exhausts from the flash tanks, but, the amount of such fuel gas is significantly less than that previously required (exemplarily $100,000 per year) for flaring the liberated gas from the stripper. Still further, this VOC stream may be advantageously utilized as a fuel gas source because of its combustibility.

In the case of new construction gas processing plants or reconstruction of existing plants, similar objectives and performance characteristics may be enjoyed from the substitution of a single flash tank having operational qualities in which the temperature and/or pressure are regulated therein so that conditions are appropriately maintained for liberating VOC thoroughly from the amine solution flow, but not driving off the acid gas constituents.

In the instances where operating pressures in the flash tank are not high enough to conduct the amine solution downstream to the top of the stripper tank, at least two solutions are available. One solution is to provide a supplemental pump for pumping the fluid from the flash tank to the stripper. A second solution is to elevate the position of the flash tank to above the stripper so that the amine solution will be under sufficient pressure upstream of the flash tank to be pressure driven to such an elevation, and from there the solution can flow to the lower stripper under the influence of gravity.

Based on simulations, as much as 80 to 90% of the VOC content can be removed in the two ways described above from the rich amine solution prior to processing through the stripper. In the instance of the supplementing configuration, about 70 percent of any remaining VOC after the original flash tank is readily removed at the supplementary VOC removal station when appropriate temperature and/or pressure conditions are maintained. In many instances, this reduces the VOC load in the rich amine to an amount that can be legally vented from the stripper. In this manner, the need for adding fuel gas to the VOC stream pulled off at the supplementing VOC removal station is either eliminated or significantly reduced resulting in an overall cost reduction for the gas treatment process. If a small amount of additional fuel gas is required, however, it is advantageous to add that fuel gas prior to the amine solution's processing in the flash tanks thereby enhancing the VOC's liberation efficiency therein. It is for this reason that such addition of fuel gas is also referred to as stripping gas in the trade.

In the same manner that a gas processing plant must reduce VOC effluent from its vent gas, a sulfur plant, which is often associated with a gas processing plant, advantageously benefits from the reduction or removal of VOC from gas streams treated therein. In the event that significant amounts of hydrogen sulfide are driven off of the amine solution at the stripper, treatment will often be necessary by a sulfur plant. A basic process of a sulfur plant is incineration which effectively treats any VOC that may remain in the exhaust stream being treated. Certain catalysts, however, are utilized in the sulfur plant's processes that can be fouled by the presence of VOC and can result in the formation of coke and soot that can be poisoning to the catalyst. As a result, there will be situations in which sulfur plants may benefit from the exploitation of the present invention.

Still further, another application for the presently disclosed invention is the treating of liquid streams for acid gas removal. The process is essentially identical, except that instead of treating natural gas in the contactor, the amine is treating liquids such as ethane, propane, or most commonly, mixed natural gas liquids (NGL mix).

In at least one embodiment, the present invention takes the form of a method for removing residual VOC components from a fluid stream used in the removal of acid gas from produced natural gas. Typically, this method will be implemented in a retro-fit environment where a flash tank already exists in a gas treatment plant. The method includes interposing a supplementing VOC removal station after a primary or original VOC removal station in an absorbent fluid stream. The absorbent fluid stream incorporates fluid into which acid gas and VOC have been absorbed from a treated gas stream such as produced natural gas. The primary VOC removal station is configured to remove an initial portion of the absorbed VOC from the absorbent fluid stream. The supplemental VOC removal station is configured to liberate a portion of residual absorbed VOC remaining in the absorbent fluid stream downstream from the primary VOC removal station. Further, the supplemental VOC removal station is configured to avoid liberating absorbed acid gas from the absorbent fluid stream.

The configuration of the supplemental VOC removal station to liberate a sufficient portion of the residual absorbed VOC remaining in the absorbent fluid stream downstream from the primary VOC removal station is calibrated to leave a remaining level of absorbed VOC in the absorbent fluid stream downstream of the supplemental VOC removal station that is legally ventable without further processing.

In one embodiment, proper conditions in the supplemental VOC removal station are established by pressure regulation. In another embodiment, proper conditions in the supplemental VOC removal station are established by temperature regulation. In a preferred embodiment using temperature regulation, a liberating temperature of approximately 190° F. is maintained therein.

In an exemplary embodiment, the absorbent fluid stream comprises an amine solution, and preferably an alkanolamine containing solution.

When advantageous, fuel gas may be added to the absorbent fluid stream upstream of the supplemental VOC removal station to assist in the removal of VOC from the absorbent fluid stream at the supplemental VOC removal station.

In at least one embodiment, the liberated portion of the residual absorbed VOC remaining in the absorbent fluid stream downstream from the primary VOC removal station is at least seventy percent.

An additional embodiment of the present invention takes the form of a method for providing a low-cost acid gas treatment plant in which a gaseous effluent mixture of VOC and acid gas are liberated from a scrubbing solution which has features similar to those described above. Still further, another embodiment of the present invention takes the form of a method for reducing operational costs of an existing acid gas treatment plant in which a gaseous effluent mixture of VOC and acid gas liberated from a scrubbing solution require the introduction of fuel gas thereto for disposal burning by retro-fitting an existing sour gas treatment plant as described herein.

The beneficial effects described above apply generally to the exemplary devices and processes disclosed herein of the apparatus and method for exclusively removing VOC from regeneratable solvent in a gas processing system. The specific structures and processes through which these benefits are delivered will be described in detail hereinbelow.

BRIEF DESCRIPTION OF THE DRAWING

The invention will now be described in greater detail in the following way by example and with reference to the attached drawing, in which.

MODE(S) FOR CARRYING OUT THE INVENTION

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a basis for the claims and as a representative basis for teaching one skilled in the art to variously employ the present invention.

Figure 1:
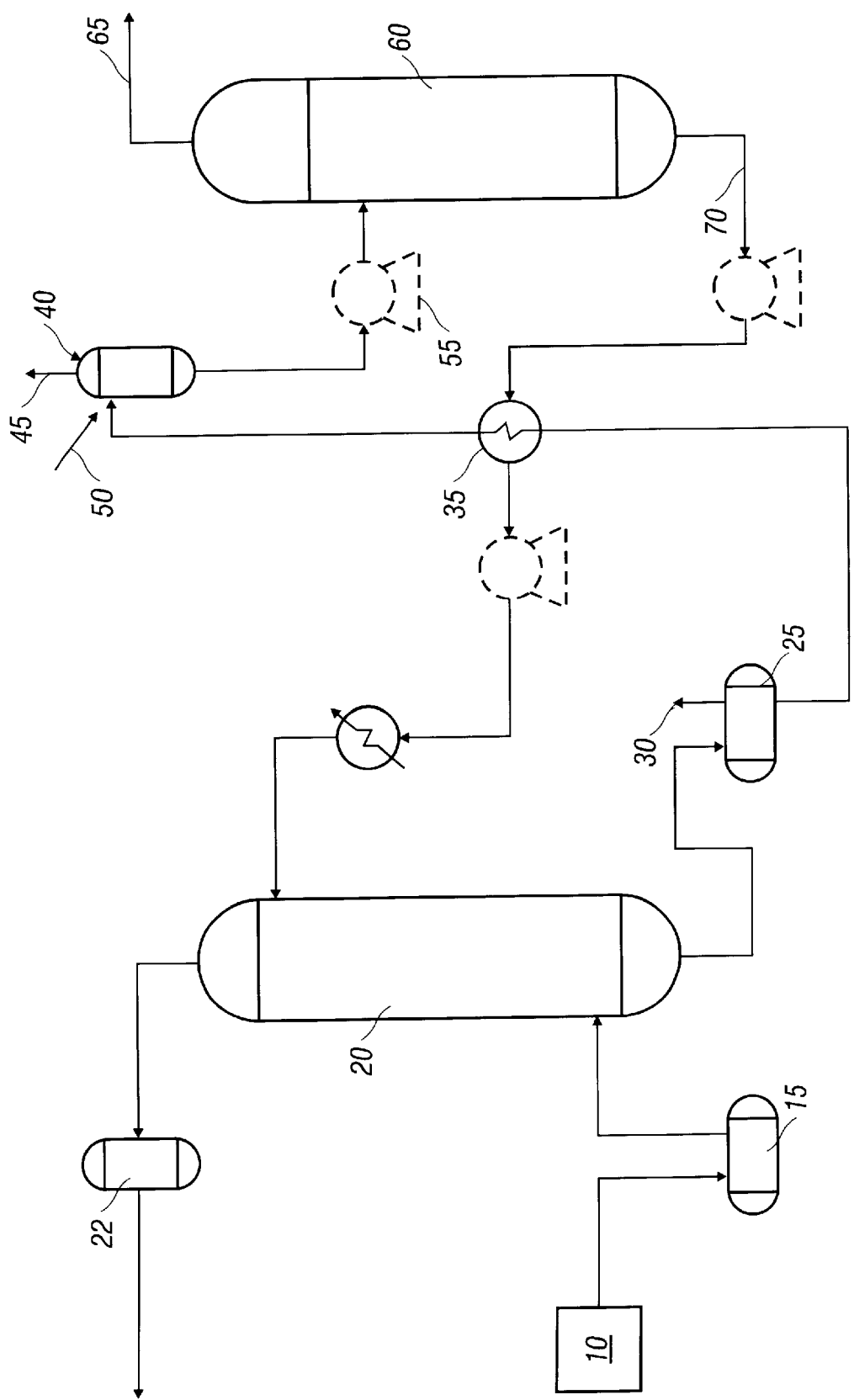
FIG. 1 is a schematic view of the present invention into which a supplementing VOC removal station has been incorporated.

Referring to FIG. 1, a schematic of an exemplary system of the present invention and its method of operation is disclosed. The method and system are utilized to process acid gas (carbon dioxide and hydrogen sulfide) out of a source 10, typically produced gas, into sweet gas 22 for an end user. In a preferred embodiment, an absorbent fluid stream such as a regeneratable solvent is utilized in the process that preferably takes the form of amine, and most preferably alkanolamine. Initially, sour gas from the source 10, such as a ground well, is conveyed through a separator tank 15 where solids and liquids are separated therefrom. From the separator tank 15, the sour gas is conveyed to a contact tower 20 that has a multistage-type design. In the illustrated embodiment, the sour gas is introduced into the contact tower at a lower location and flowed up through the tower 20 against oppositely traveling amine solution which has been introduced at an upper location of the tower 20.

As a result of physical contact between the oppositely traveling fluids, associated components within the gas stream are absorbed into the amine solution. What was originally "lean" or "clean" amine solution is subsequently laden with these components having an affinity therefore. Among others, those components include VOC and acid gas constituents. Typically, the souring components include carbon dioxide and hydrogen sulfide which are acid gas constituents. VOC includes organic compounds that are heavier than ethane with examples being ethane, propane, butane, benzene, toluene, and xylene. When laden with these compounds, the amine solution is referred to as "rich." The amine solution can be regenerated by removing these compounds and then being recirculated back to the contact tower 20.

In the illustration of FIG. 1, the regeneration process begins at a primary or original VOC removal station 25 that in a preferred embodiment takes the form of a first flash tank. In the primary VOC removal station 25, the 900 psia pressure under which processing occurred in the contact tower 20 is flashed down to a significantly lower pressure on the order of 65 psia. As a result of this flash lowering of pressure, the more volatile compounds, and primarily the VOC, vaporize out of the amine solution and are liberated therefrom. This now liberated VOC is conducted from the primary removal station 25 through a primary VOC vent 30 for additional processing and/or utilization.

The rich amine solution is conveyed toward a supplemental VOC removal station 40 that preferably takes the form of a second flash tank. Before reaching the supplemental VOC removal station 40, however, the rich amine solution passes through a heat exchanger 35 for thermal communication with hotter lean regenerated amine solution being conducted back toward the contact tower 20.

The conditions within the supplemental VOC removal station 40 are maintained so as to further liberate residual VOC from the amine solution, while simultaneously avoiding the liberation of the entrained acid gas constituents; especially the carbon dioxide. This is accomplished by selecting an appropriate temperature and/or pressure for such VOC liberation. In a preferred embodiment, the temperature maintained in the primary VOC removal station 25 is approximately 130 degrees Fahrenheit. The temperature of the amine solution is raised to approximately 190 degrees Fahrenheit in the supplemental VOC removal station 40. At this second higher temperature, VOC is liberated from the amine solution, but the sour components, including carbon dioxide and hydrogen sulfide remain in solution and are conducted further on through the regenerative process. This is important since the VOC is primarily combustible while at least the carbon dioxide resists combustion. Therefore, if the load of carbon dioxide were significant, fuel gas would have to be added in order to flare the VOC, getting back to the costly characteristics of previously known designs for gas processing plants.

Because of this supplemental stage of the process, a more thorough cleansing of the amine solution is accomplished with respect to VOC upstream of the stripper. Still further, because the liberated VOC at the supplemental VOC station 40 is not fully dilute with carbon dioxide, and in many circumstances it readily burns under its own combustibility without necessitating the injection of supplemental fuel gas if it is to be flared. Therefore, the liberated VOC at the supplemental VOC removal station 40 is conveyed therefrom through a supplemental VOC vent 45. From that vent 45, the VOC can be utilized as a fuel gas or flared for legal disposal.

Though supplemental fuel gas is not generally required for the combustion of the VOC liberated at the supplemental removal station 40, such fuel gas may be added through a fuel gas inlet 50 prior to, or contemporaneously with the amine's introduction into the removal station 40 to aid in the release of the VOC out of solution. The amounts of gas, however, are significantly less than those required for flaring purposes in previously known designs.

If reduced pressure is to be used at the supplemental VOC removal station 40 for liberating the VOC in the amine solution, a pump 55 may be advantageously placed in fluid communication therewith for that purpose. Still further, the pump 55 can be utilized to convey the amine solution to the stripper tower 60 where that solution is further regenerated. At the stripper tower 60, the temperature is raised above that of the supplemental VOC removal station 40 thereby driving off the sour components (acid gas) as an exhaust 65 out of the absorbent fluid stream of amine. In the illustrated embodiment, the acid gas exhaust 65 is located near the top of the stripper tower 60.

A return 70 toward the contact tower 20 is provided for the regenerated absorbent fluid stream, now in the form of a lean amine solution, at a lower position on the stripper tower 60.

Figure 2:
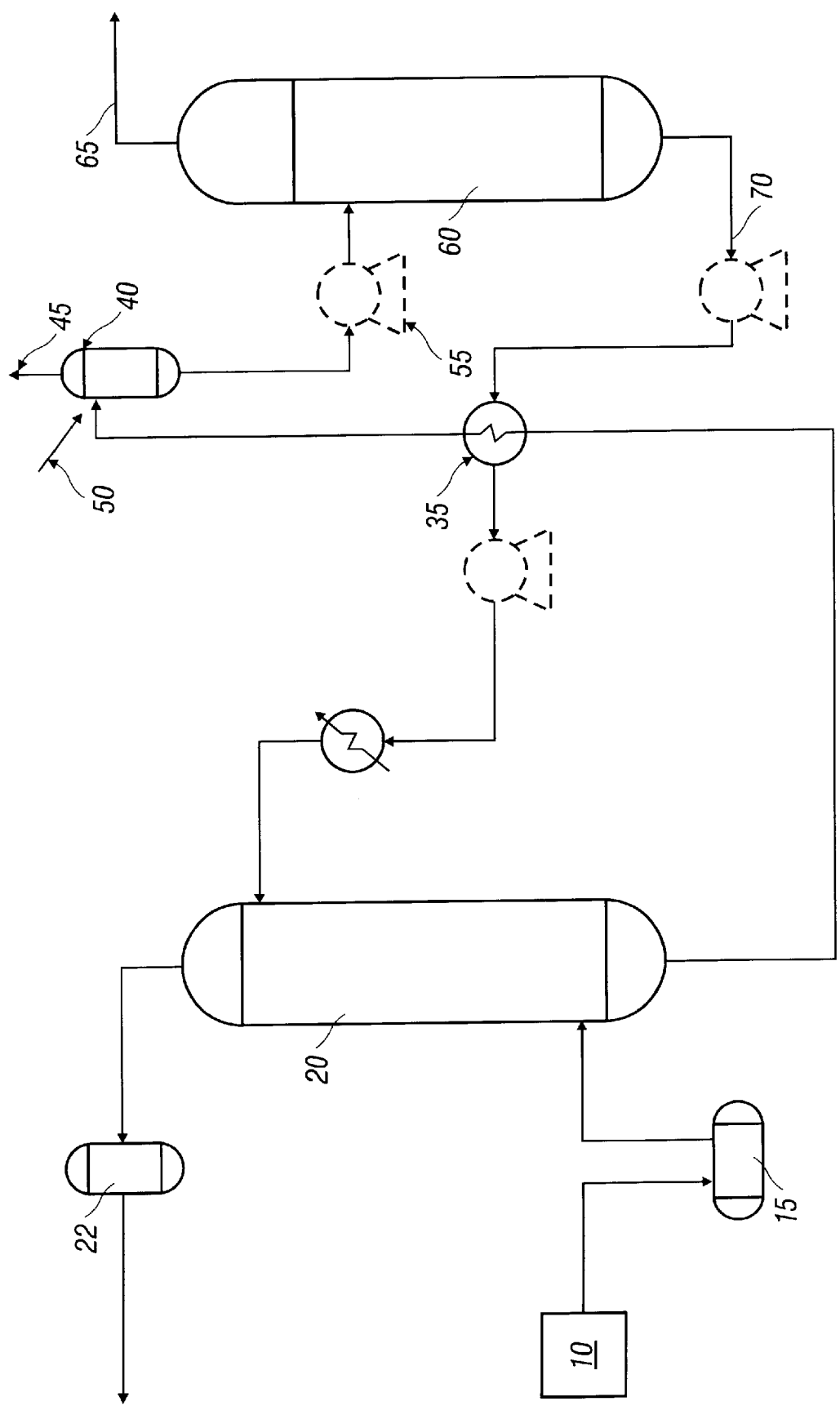
FIG. 2 is a schematic view of an alternative embodiment of the present invention into which an enhanced VOC removal station has been incorporated.

FIG. 2 illustrates an alternative configuration that may be utilized in reconstructions or new constructions where a single flash tank is utilized that is appropriately controlled with respect to temperature and/or pressure to liberate VOC, but not acid gas. When lower pressures are utilized to liberate VOC, either a pump can be utilized to lift the fluid to the top of the stripper, or the flash tank can be located at an elevation sufficiently high to permit gravity flow of the processed amine solution from the flash tank to the stripper.

An apparatus and method for exclusively removing VOC from regeneratable solvent in a gas processing system and its components have been described herein. These and other variations, which will be appreciated by those skilled in the art, are within the intended scope of this invention as claimed below. As previously stated, detailed embodiments of the present invention are disclosed herein; however, it is to be understood that the disclosed embodiments are merely exemplary of the invention that may be embodied in various forms.

The following tables illustrate the efficacy and benefits enabled through the utilization of at least five of the several possible embodiments of the present invention. The first table illustrates the sub-par efficiency of a typical and previously known gas processing plant similar to that disclosed in U.S. Pat. No. 4,548,620. The second table demonstrates the efficiencies of using a supplementing hot temperature, low pressure flash tank after a primary or original flash tank. The third table demonstrates the efficiencies of using one low pressure flash tank. The fourth table demonstrates the efficiencies of using one high temperature, high pressure flash tank. (In this configuration, no auxiliary lift is needed to move the amine solution from the flash tank to the stripper.) The fifth table demonstrates the efficiencies of using one high temperature, low pressure flash tank. (In this configuration, an auxiliary lift is needed to move the amine solution from the flash tank to the stripper.) The sixth table demonstrates the efficiencies of using one low pressure flash tank that is elevated above the stripper. Amine solution is permitted to flow to the stripper under the influence of gravity. (In this configuration, no auxiliary lift is needed to move the amine solution from the flash tank to the stripper.)

The common basis upon which the following simulations were run (conditions that were varied from run to run are as follows: Inlet gas volume, 50,000 MCFD; Inlet gas conditions, 90 degrees Fahrenheit and 1000 psia; Amine circulation rate, 600 gallons per minute of 30 percent by weight DEA solution; and an Inlet gas composition of: water, 0.10 mol %; carbon dioxide, 7.00 mol %; nitrogen, 0.50 mol %; methane, 84.45 mol %; ethane, 4.60 mol %; propane, 1.70 mol %; isobutane, 0.40 mol %; n-butane, 0.50 mol %; isopentane, 0.20 mol %; n-pentane, 0.15 mol %; n-hexane, 0.21 mol %; n-heptane, 0.143 mol %; benzene, 0.02 mol %; toluene, 0.017 mol %; ethylbenzene, 0.001 mol %; and xylene, 0.009 mol %.

| | PREVIOUSLY KNOWN PROCESS (Single Flash Tank Conditions: 64.7 psia and 139° F.) | | | | |
|---|---|---|---|---|---|
| | CONTACTOR FEED, LB/HR | RICH AMINE FROM CONTACTOR LB/HR | VAPOR FROM PRIMARY FLASH TANK, LB/HR | VAPOR FROM SECONDARY FLASH TANK, LB/HR | STILL ACID GAS VENT, LB/HR |
| BENZENE | 85.77 | 6.217 | 1.106 | N/A | 5.111 |
| TOLUENE | 85.99 | 4.317 | 0.895 | N/A | 3.421 |
| ETHYL-BENZENE | 5.829 | 0.15 | 0.046 | N/A | 0.105 |
| XYLENE | 52.46 | 2.149 | 0.501 | N/A | 1.648 |
| TOTAL BTEX | 230.049 | 12.833 | 2.548 | N/A | 10.285 |
| CO2 | 16913 | 17746 | 42.471 | N/A | 16859 |

CASE 1: LOW PRESSURE FLASH W/ SUPPLEMENTAL HOT, LOW PRESSURE FLASH
(First Flash Tank Conditions: 14.7 psia and 138° F.)
(Second Flash Tank Conditions: 24.7 psia and 187° F.)

| | CONTACTOR FEED, LB/HR | RICH AMINE FROM CONTACTOR LB/HR | VAPOR FROM PRIMARY FLASH TANK, LB/HR | VAPOR FROM SECONDARY FLASH TANK, LB/HR | STILL ACID GAS VENT, LB/HR | STILL VENT AS % OF PRIOR ART |
|---|---|---|---|---|---|---|
| BENZENE | 85.77 | 6.217 | 3.801 | 1.791 | 0.6249 | 12.22% |
| TOLUENE | 85.99 | 4.317 | 2.818 | 1.188 | 0.3103 | 9.07% |
| ETHYL-BENZENE | 5.829 | 0.15 | 0.1137 | 0.032 | 0.005 | 4.76% |
| XYLENE | 52.46 | 2.149 | 1.471 | 0.568 | 0.11 | 6.67% |
| TOTAL BTEX | 230.049 | 12.833 | 8.2037 | 3.579 | 1.0502 | 10.21% |
| $CO_2$ | 16913 | 17746 | 294.1 | 1380 | 15227 | |

CASE 2: LOW PRESSURE PRIMARY FLASH
(Single Flash Tank Conditions: 14.7 psia and 138° F.)

| | CONTACTOR FEED, LB/HR | RICH AMINE FROM CONTACTOR, LB/HR | VAPOR FROM PRIMARY FLASH TANK, LB/HR | VAPOR FROM SECONDARY FLASH TANK, LB/HR | STILL ACID GAS VENT, LB/HR | STILL VENT AS % OF PRIOR ART |
|---|---|---|---|---|---|---|
| BENZENE | 85.77 | 6.217 | 3.801 | N/A | 2.416 | 47.27% |
| TOLUENE | 85.99 | 4.317 | 2.818 | N/A | 1.498 | 43.79% |
| ETHYL-BENZENE | 5.829 | 0.15 | 0.1137 | N/A | 0.037 | 35.24% |
| XYLENE | 52.46 | 2.149 | 1.471 | N/A | 0.678 | 41.14% |
| TOTAL BTEX | 230.049 | 12.833 | 8.2037 | N/A | 4.629 | 45.01% |
| $CO_2$ | 16913 | 17746 | 294.1 | N/A | 16608 | |

CASE 3: HIGH PRESSURE HOT FLASH TANK
(Single Flash Tank Conditions: 64.7 psia and 189° F.)

| | CONTACTOR FEED, LB/HR | RICH AMINE FROM CONTACTOR, LB/HR | VAPOR FROM PRIMARY FLASH TANK, LB/HR | VAPOR FROM SECONDARY FLASH TANK, LB/HR | STILL ACID GAS VENT, LB/HR | STILL VENT AS % OF PRIOR ART |
|---|---|---|---|---|---|---|
| BENZENE | 85.77 | 6.217 | 2.405 | N/A | 3.812 | 74.58% |
| TOLUENE | 85.99 | 4.317 | 1.988 | N/A | 2.329 | 68.08% |
| ETHYL-BENZENE | 5.829 | 0.15 | 0.087 | N/A | 0.063 | 60.00% |
| XYLENE | 52.46 | 2.149 | 1.154 | N/A | 0.995 | 60.38% |
| TOTAL BTEX | 230.049 | 12.833 | 5.634 | N/A | 7.199 | 70.00% |
| $CO_2$ | 16913 | 17746 | 434.8 | N/A | 16467 | |

CASE 4: HOT, LOW PRESSURE, PRIMARY FLASH TANK
(Single Flash Tank Conditions: 14.7 psia and 179° F.)

| | CONTACTOR FEED, LB/HR | RICH AMINE FROM CONTACTOR, LB/HR | VAPOR FROM PRIMARY FLASH TANK, LB/HR | VAPOR FROM SECONDARY FLASH TANK, LB/HR | STILL ACID GAS VENT, LB/HR | STILL VENT AS % OF PRIOR ART |
|---|---|---|---|---|---|---|
| BENZENE | 85.77 | 6.217 | 5.884 | N/A | 0.334 | 6.53% |
| TOLUENE | 85.99 | 4.317 | 4.138 | N/A | 0.179 | 5.23% |
| ETHYL-BENZENE | 5.829 | 0.15 | 0.1463 | N/A | 0.004 | 3.81% |
| XYLENE | 52.46 | 2.149 | 2.081 | N/A | 0.068 | 4.13% |
| TOTAL BTEX | 230.049 | 12.833 | 12.2493 | N/A | 0.585 | 5.69% |
| CO2 | 16913 | 17746 | 3775 | N/A | 13126 | |

CASE 5: HOT, GRAVITY FEED, LOW PRESSURE PRIMARY FLASH TANK
(Single Flash Tank Conditions: 19.7 psia and 182° F.)

| | CONTACTOR FEED, LB/HR | RICH AMINE FROM CONTACTOR, LB/HR | VAPOR FROM PRIMARY FLASH TANK, LB/HR | VAPOR FROM SECONDARY FLASH TANK, LB/HR | STILL ACID GAS VENT, LB/HR | STILL VENT AS % OF PRIOR ART |
|---|---|---|---|---|---|---|
| BENZENE | 85.77 | 6.217 | 5.626 | N/A | 0.5853 | 11.45% |
| TOLUENE | 85.99 | 4.317 | 3.999 | N/A | 0.3143 | 9.19% |
| ETHYL-BENZENE | 5.829 | 0.15 | 0.1432 | N/A | 0.007 | 6.67% |
| XYLENE | 52.46 | 2.149 | 2.028 | N/A | 0.1198 | 7.27% |
| TOTAL BTEX | 230.049 | 12.833 | 11.7962 | N/A | 1.0264 | 9.98% |
| CO2 | 16913 | 17746 | 3032 | N/A | 13862 | |

INDUSTRIAL APPLICABILITY

The present invention finds applicability in the gas processing and refining industries.

What is claimed and desired to be secured by Letters Patent is as follows:

1. An acid gas removal apparatus to remove volatile organic compounds from an absorbent fluid stream comprising:

a fluid source from which flows an absorbent fluid stream under pressure, said absorbent fluid stream comprising volatile organic compounds and at least one acid gas constituent absorbed from a sour fluid stream;

a controllable VOC removal station fluidly connected to said fluid source, said controllable VOC removal station comprising at least one VOC vent, said absorbent fluid stream passing through said controllable VOC removal station, said controllable VOC removal station significantly reducing pressure and regulating temperature of said absorbent fluid stream to liberate said volatile organic compounds thoroughly from said absorbent fluid stream without significant liberation of any said acid gas constituent, such that subsequent processing of said absorbent fluid stream does not result in further liberation of said volatile organic compounds exceeding a pre-determined VOC level, said at least one VOC vent carries away said liberated volatile organic compounds from said controllable VOC removal station; and a stripping station fluidly connected to said controllable VOC removal station, said stripping station comprising at least one exhaust, said absorbent fluid stream passing through said stripping station, said stripping station regulating temperature of said absorbent fluid stream to liberate at least one of said acid gas constituents from said absorbent fluid stream, said at least one exhaust carries away said liberated acid gas constituents from said stripping station.

2. The acid gas removal apparatus in claim 1, further comprising a pump fluidly connected and positioned between said controllable VOC removal station and said stripping station, said controllable VOC removal station reduces said pressure of said absorbent fluid stream to a value that by itself is insufficient to move said absorbent fluid stream away from said controllable VOC removal station and to said stripping station, said pump encouraging movement of said absorbent fluid stream away from said controllable VOC removal station and to said stripping station.

3. The acid gas removal apparatus in claim 1, wherein said controllable VOC removal station reduces said pressure of said absorbent fluid stream to a value that by itself is insufficient to move said absorbent fluid stream away from said controllable VOC removal station and to said stripping station, said controllable VOC removal station elevated to a sufficient height above said stripper station to encourage movement of said absorbent fluid stream away from said controllable VOC removal station and to said stripping station.

4. The acid gas removal apparatus in claim 1, wherein said controllable VOC removal station further comprises:
  a first controllable flash tank having a primary VOC vent, said first controllable flash tank fluidly connected to said fluid source, said first controllable flash tank configured to flow and significantly drop the pressure of said absorbent fluid stream to liberate said volatile organic compounds throughly from said absorbent fluid stream without significant liberation of any said acid gas constituent, said primary VOC vent carries away said liberated volatile organic compounds and said liberated acid gas constituents from said first controllable flash tank;
  a heat exchanger fluidly connected to said first controllable flash tank and a second controllable flash tank, said heat exchanger configured to significantly raise the temperature of said absorbent fluid stream flowing from said first controllable flash tank to said second controllable flash tank,
  said second controllable flash tank having a secondary VOC vent, said second controllable flash tank is configured to flow and maintain a temperature of said absorbent fluid stream which causes the liberation of additional said volatile organic compounds from said absorbent fluid stream without significant liberation of any said acid gas constituent such that subsequent processing of said absorbent fluid stream does not result in further liberation of said volatile organic compounds exceeding a pre-determined VOC level, said secondary VOC vent carries away said liberated volatile organic compounds.

5. The acid gas removal apparatus in claim 1, wherein said liberated volatile organic compounds are comprised at least partially of a plurality of components heavier than ethane.

6. The acid gas removal apparatus in claim 1, wherein said liberated volatile organic compounds are comprised at least partially of a plurality of components selected from a group consisting of benzene, toluene, ethylbenzene and xylene.

7. The acid gas removal apparatus in claim 1, wherein said pre-determined VOC level comprises at least one limit value for volatile organic compounds heavier than ethane.

8. The acid gas removal apparatus in claim 1, wherein said controllable VOC removal station further comprises a stripping gas inlet fluidly connected to a fuel gas source, said stripping gas inlet introduces a stripping gas into said absorbent stream to enhance said liberation of volatile organic compounds.

9. The acid gas removal apparatus in claim 4, wherein said second controllable flash tank further comprises a stripping gas inlet fluidly connected to a fuel gas source, said stripping gas inlet introduces a stripping gas into said absorbent stream to enhance said liberation of volatile organic compounds from said absorbent fluid stream.

10. The acid gas removal apparatus in claim 1, wherein said stripping station is fluidly connected to said fluid source thereby allowing said absorbent fluid stream to repeat absorption of said at least one acid gas constituent from a sour fluid stream and circulation through said controllable VOC removal station and said stripping station.

11. The acid gas removal apparatus in claim 10, wherein said fluid source is a contact station comprising a sweet gas vent, said contact station is fluidly connected to a sour gas source from which said sour gas stream flows into said contact station, said contact station alters the temperature of said absorbent fluid stream to encourage absorption of at least one acid gas constituent into said absorbent fluid stream while simultaneously encouraging liberation of organic compounds lighter than and including ethane.

12. The acid gas removal apparatus in claim 1, wherein said absorbent fluid stream comprises an amine solution.

13. The acid gas removal apparatus in claim 10, wherein said amine solution is an alkanolamine containing solution.

14. The acid gas removal apparatus in claim 1, wherein said sour fluid stream comprises primarily natural gas.

15. The acid gas removal apparatus in claim 5, wherein said sour fluid stream comprises primarily ethane.

16. The acid gas removal apparatus in claim 5, wherein said sour fluid stream comprises primarily propane.

17. The acid gas removal apparatus in claim 5, wherein said sour fluid stream comprises primarily mixed natural gas liquids.

18. A method to remove volatile organic compounds from an absorbent fluid stream of an acid gas removal apparatus comprising the steps of:
  moving an absorbent fluid away from an absorbent fluid source and through a VOC removal station, said absorbent fluid comprising a fluid into which volatile organic compounds and at least one acid gas constituent have been absorbed from a sour fluid stream;
  controlling the pressure and temperature of said absorbent fluid flowing through said VOC removal station to liberate substantially all of said absorbed volatile organic compounds without significant liberation of acid gas constituents from said absorbent fluid so that remaining volatile organic compounds liberated downstream in said stripping station do not exceed a pre-determined VOC level;
  conducting said liberated absorbed volatile organic compounds from said VOC removal station through at least one VOC vent;
  moving said absorbent fluid from said VOC removal station and through a stripping station;
  adjusting said stripping station to liberate said at least one of acid gas constituent from said absorbent fluid; and
  conducting said liberated acid gas constituent from said stripping station through at least one stripping vent.

19. The method as recited in claim 18, wherein a pump causes said movement of said absorbent fluid from said VOC removal station to said stripping station.

20. The method as recited in claim 18, wherein said VOC removal station is positioned at an elevation above said stripping station to cause said movement of said absorbent fluid from said VOC removal station to said stripping station.

21. The method as recited in claim 18, wherein said liberation of said volatile organic compounds from said absorbent fluid occurs in a primary flash tank and at least one supplemental flash tank during movement through said VOC removal station.

22. The method as recited in claim 21, wherein said pressure control occurs primarily in said primary flash tank causing a significant liberation of said volatile organic compounds from said absorbent fluid.

23. The method as recited in claim 22, wherein said temperature control comprises the steps of:
  heating said absorbent fluid during movement of said absorbent fluid from said primary flash tank to said at least one supplemental flash tank; and
  maintaining a temperature range of said absorbent fluid during movement through said at least one supplemental flash tank, said temperature range being sufficient to promote additional liberation of said volatile organic compounds without significant liberation of said acid gas constituents from said absorbent fluid.

24. The method as recited in claim 18, wherein said control of pressure and temperature of said absorbent fluid occurs substantially in one primary flash tank during movement of said absorbent fluid through said VOC removal station.

25. The method as recited in claim 24, further comprising adjusting the operational parameters of said one primary flash tank to include a temperature setting of approximately 138° Fahrenheit and a pressure setting of approximately 14.7 psia.

26. The method as recited in claim 24, further comprising adjusting the operational parameters of said one primary flash tank to include a temperature setting no lower than 138° Fahrenheit and a pressure setting no greater than 14.7 psia.

27. The method as recited in claim 24, further comprising adjusting the operational parameters of said one primary flash tank to include a temperature setting approximately 189° Fahrenheit and a pressure setting of approximately 64.7 psia.

28. The method as recited in claim 24, further comprising adjusting the operational parameters of said one primary flash tank to include a temperature setting no lower than 189° Fahrenheit and a pressure setting no greater than 64.7 psia.

29. The method as recited in claim 24, further comprising adjusting the operational parameters of said one primary flash tank to include a temperature setting approximately 179° Fahrenheit and a pressure setting of approximately 14.7 psia.

30. The method as recited in claim 24, further comprising adjusting the operational parameters of said one primary flash tank to include a temperature setting no lower than 179° Fahrenheit and a pressure setting no greater than 14.7 psia.

31. The method as recited in claim 24, further comprising adjusting the operational parameters of said one primary flash tank to include a temperature setting approximately 182° Fahrenheit and a pressure setting of approximately 19.7 psia.

32. The method as recited in claim 24, further comprising adjusting the operational parameters of said one primary flash tank to include a temperature setting no lower than 182° Fahrenheit and a pressure setting no greater than 19.7 psia.

33. A method to remove volatile organic compounds from an absorbent fluid of an acid gas removal apparatus comprising the steps of:

moving the absorbent fluid through a VOC removal station and a stripping station, the absorbent fluid comprising a fluid into which volatile organic compounds and at least one acid gas constituent have been absorbed from a sour fluid stream;

generating a vent stream from the absorbent fluid moving through the VOC removal station by regulating the temperature and pressure of the absorbent stream, the vent stream comprising volatile organic compounds and at least one acid gas constituent liberated from the absorbent fluid, wherein the ratio of the liberated volatile organic compounds to the liberated at least one acid gas constituent is significantly higher than a similar ratio of any subsequent stream generated from the absorbent fluid stream flowing through the stripping station;

conveying the vent stream away from the VOC removal station;

generating an exhaust stream from the absorbent fluid moving through the stripping station by regulating the temperature of the absorbent stream, the exhaust stream comprising at least one acid gas constituent and a concentration of volatile organic compounds less than a pre-determined VOC level liberated from the absorbent stream; and conveying the exhaust stream away from said stripping station.

34. The method as recited in claim 33, wherein two vent streams are generated from the absorbent fluid moving through the VOC removal station, the VOC removal station comprising a primary flash tank fluidly connected to a supplemental flash tank, generation of the first vent stream occurs by applying a pressure reduction to the absorbent fluid while moving through the primary flash tank; generation of the second combustible vent stream occurs by heating the absorbent fluid while moving between the primary and supplemental flash tanks and thereafter maintaining a temperature value of the absorbent fluid while moving through the supplemental flash tank, the pressure reduction encouraging a substantial liberation of the volatile organic compounds from the absorbent fluid, and the temperature value encouraging liberation of volatile organic compounds without significant liberation of the at least one acid gas constituent.

\* \* \* \* \*